Patented Oct. 19, 1948

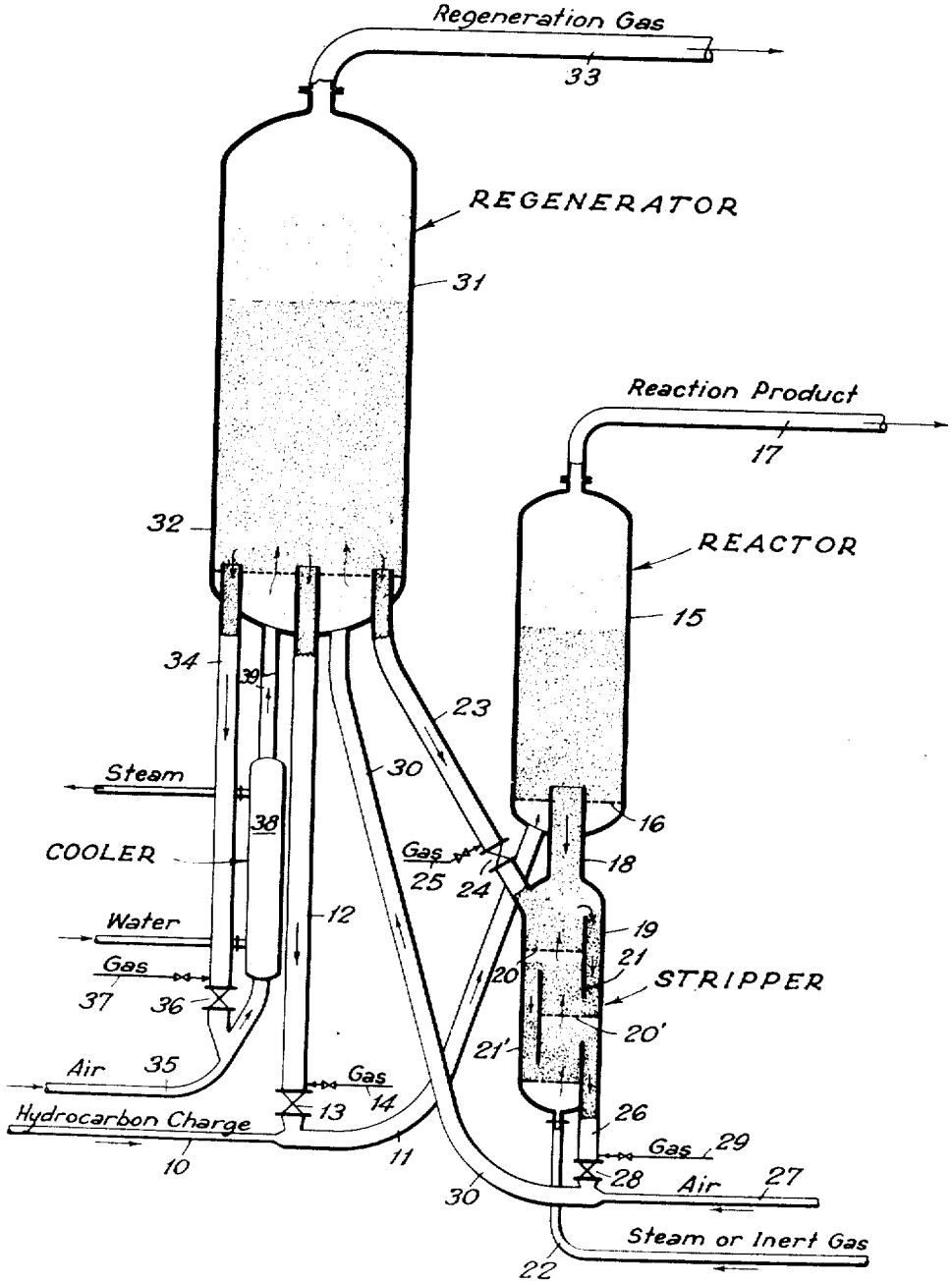

2,451,619

UNITED STATES PATENT OFFICE 2,451,619

CATALYTIC CONVERSION PROCESS

Robert J. Hengstebeck, Chicago, and Robert S. McDaniel, Alton, Ill., assignors to Standard Oil Company, Chicago, Ill., a corporation of Indiana Application November 20, 1944, Serial No. 564,349

8 Claims. (Cl. 196—52)

This invention relates to a catalytic conversion system and it pertains more particularly to an improvement in a fluidized catalyst hydrocarbon conversion system.

Fluidized catalyst hydrocarbon conversion systems are now well known to the art the most outstanding being the "fluid" type catalytic cracking systems which are now extensively utilized for the production of aviation and motor gasoline. Such cracking systems employ high catalyst-to-oil ratios in order to obtain high conversions and high throughputs and in order to utilize more effectively in the reaction zone the heat which is generated in the regeneration zone and stored as sensible heat in the catalyst particles. The use of high catalyst-to-oil ratios has aggravated the stripping problem, i. e. the problem of effectively removing hydrocarbon material from relatively spent catalyst before that catalyst is returned to the regeneration zone. An object of our invention is to provide an improved method and means for effectively stripping hydrocarbon material from spent catalyst more particularly in systems employing high catalyst-to-oil ratios.

It has been proposed to increase the amount of stripping steam employed but this is often undesirable because of the deleterious effect of such steam on the activity and life of the catalyst. It has likewise been proposed to effect stripping in indirect heat exchange with the regeneration zone but this proposal offers construction difficulties and could not be employed in plants of the type now used. The use of heat exchangers in the stripping zone has been considered in order to raise the effective stripping temperature but such structures are undesirable from an engineering standpoint. An object of our invention is to provide an improved method of increasing the effectiveness of stripping operations which will avoid the objections of previously proposed systems and which will be more effective and efficient than previously proposed methods. A further object is to minimize the degradation of charging stock to coke. A further object is to minimize the amount of required regeneration, i. e., to effect savings in construction and operating costs of regenerators, air compressors, etc. A further object is to improve the yield and quality of product obtainable by fluidized catalyst conversion processes. Other objects will be apparent as the detailed description of the invention proceeds.

It has been found that stripping temperature has a marked effect on the hydrocarbon content of spent catalyst contamination, an increase of 50° F. to 75° F. stripping temperature being sufficient to markedly affect the amount of hydrocarbon left on the stripped catalyst. It is uneconomic to raise the catalyst temperature any appreciable amount by the use of superheated stripping gas such as steam and furthermore sucn steam has in many cases been found to be deleterious to catalyst life and activity. By our invention improved spent catalyst stripping is attained by circulating regenerated catalyst through the stripping zone. Regenerated catalyst is usually about 100° F. to 150° F. or more higher in temperature than the stripping zone and by recycling an approximately equal amount of regenerated catalyst through the stripping zone the temperature thereof may readily be increased by about 50° F. to about 75° F. The catalyst head between the regeneration and stripping zone is sufficient to effect this catalyst transfer without the use of pumps or impellers. By intimately mixing hot regenerated catalyst with spent catalyst in the stripping zone the heat transfer is enormously more efficient than could possibly be attained by indirect heat exchange. When spent catalyst is returned with air through a relatively long transfer line to the regenerator, there is often a danger of overheating in the transfer line due to combustion taking place therein; by circulating relatively clean catalyst from the regenerator through the stripping zone and then returning the catalyst mixture to the regenerator we introduce a heat absorbing material (clean catalyst) with spent catalyst which is being returned to the regenerator through the relatively long transfer line thereby minimizing the danger of overheating in the transfer line itself. In other words, we avoid the danger of overheating the catalyst in the transfer line by having admixed with the returned spent catalyst a sufficient amount of regenerated catalyst to absorb any excessive amounts of heat that may be generated by the burning of carbonaceous material which inevitably takes place in the transfer line itself.

The invention will be more clearly understood from the following detailed description of a specific example read in conjunction with the accompanying drawing which forms a part of this specification and which is a schematic vertical section taken through our improved catalytic conversion system.

The invention will be described as applied to the catalytic cracking of gas oil for the production of motor fuel and aviation gasoline but it should be understood that the invention is also applicable to other catalytic conversion processes such, for example, as reforming, isomerization, aromatization, desulfurization, hydrogenation, dehydrogenation, hydroforming, etc. The catalyst employed for catalytic cracking may be of any known type such as acid treated bentonite or montmorillonite clay (Super Filtrol), synthetic zeolites, silica-alumina, silica-magnesia, alumina-boron oxide, etc. The catalyst should be in finely divided form with particle sizes preferably within the range of 1 to 200 microns and predominantly between 10 and 100 microns. Since such catalysts in the catalytic cracking system generally are now known to the art (note U. S. Letters Patent 2,337,684, 2,341,193, 2,304,128, 2,303,047, etc.) a detailed description thereof is unnecessary.

Referring to the drawing, a hydrocarbon charging stock such for example as any conventional gas oil, which may be relatively cold and non-vaporized or completely or partially vaporized by preheating to a temperature within the approximate range of 400 to 900° F., is introduced through line 10 to transfer line 11 and on its introduction thereto it picks up hot regenerated catalyst from the base of standpipe 12 in amounts regulated by valve 13. The catalyst in standpipe 12 may be at a temperature of about 1000° F. to 1050° F. or more and the catalyst is maintained in fluent, i. e. fluidized, "liquid-like" form in the standpipe by means of aeration gas introduced through line 14. The catalyst-to-oil weight ratio is preferably within the approximate range of 5:1 to 30:1, for example it may be about 18:1, the extent to which the charging stock is preheated being determined to a considerable extent on regenerated catalyst temperature, desired reaction temperature, and the catalyst-to-oil weight ratio employed. The charging stock is thus completely vaporized and is introduced through transfer line 11 at a temperature of the order of 900° F. to 1000° F. and at a pressure of the order of 18 to 20 pounds per square inch into the lower part of reactor 15, the incoming stream being distributed uniformly in the reactor by means of grid 16. The reactor is preferably designed for vertical gas or vapor velocities of the order of about .5 to 3 or preferably 1 to 1½ feet per second and the temperature in the reactor, which is uniform throughout, may be of the order of about 925° F. The pressure in the reactor immediately above grid 16 may be of the order of about 16 pounds per square inch while the pressure in the top of the reactor is only about 10 pounds per square inch, this difference being due to the head of catalyst in the reactor. With catalyst sizes and velocities hereinabove indicated a dense liquid-like catalyst phase is maintained in the reactor the density of which may be in the approximate range of 10 to 30, usually about 18 to 25 pounds per cubic foot. Cyclone separators with dip legs extending downwardly into the dense phase, as shown by U. S. 2,337,384, or other known means may be employed to remove any entrained catalyst particles from the product stream which is withdrawn from the top of the reactor through line 17.

Relatively spent catalyst is withdrawn from the reactor through stripping column 18 at substantially the same rate as catalyst is introduced into the reactor. Column 18 is preferably a cylindrical conduit extending upwardly through the base of the reactor with its upper end terminating above grid or distributor 16. The lower part of the stripping column may be enlarged to provide a stripping chamber 19 and as illustrated in the drawing, this stripping chamber may be provided with a plurality of stripping stages by perforated plates 20 and 20' and downcomers 21 and 21'. Steam or other inert stripping gas is introduced at the base of this stripper through line 22 and it passes upwardly from zone to zone through the perforations in plate 20' and plate 20 and thence upwardly through column 18.

In accordance with our invention hot regenerated catalyst at a temperature of about 1000° F. to 1050° F. is introduced into stripping chamber 19 through standpipe 23 in amounts controlled by slide valve 24, the catalyst in the standpipe being maintained in aerated liquid-like condition by means of aeration gas introduced through line 25. The aeration gas in this particular case may be steam or an inert gas or it may be a hydrocarbon gas; the aeration gas may effect the displacement of any oxygen containing gases from catalyst thus transferred to the stripper and the use of hydrocarbons may serve the added function of scavenging the remaining oxygen, i. e. removing it by combustion. The amount of hot regenerated catalyst thus transferred to stripper 19 may be approximately equal to the amount of spent catalyst passing downwardly through column 18. Generally speaking, such amount should be within the approximate range of 20 to 200% based on spent catalyst introduced into the stripper.

By introducing steam or inert stripping gas through line 22 at such a rate that the vertical effective gas velocity is about .5 to 1 or more feet per second in the stripper sufficient turbulence can be obtained to insure intimate mixing of the hot regenerated catalyst with the spent catalyst thereby insuring uniformity throughout each stage of the stripping zone. The catalyst moving downwardly from stage to stage through downcomers 21 is substantially out of contact with the upflowing gases. It should be understood, however, that our invention is not limited to this particular embodiment since any of the known means may be employed to secure the desired intimacy of mixing between the spent catalyst and the hot regenerated catalyst. Mechanical mixers or distributors may be employed in vertically vaned strippers. In some cases the stripping zone does not require enlargement but may be a column of substantially uniform diameter throughout and the necessary turbulence for mixing may be obtained by either mechanical means or by regulating the velocity of stripping gas or by the manner in which the hot catalyst is injected into the stripping column.

By mixing the hot regenerated catalyst with the relatively spent catalyst the temperature of the latter is increased from about 900° F. to 950° F. or about 975° F. and at this increased temperature the same amount of stripping steam is remarkably more effective. The amount of carbonaceous material on the spent catalyst is considerably reduced and the yield and quality of conversion products are markedly increased.

The mixture of stripped spent catalyst with regenerated catalyst leaves stripper 19 through conduit or standpipe 26 from the base of which it is picked up by air introduced through line 27. The rate of catalyst discharge is controlled by slide valve 28 and the catalyst is retained in fluent form by aeration gas from line 29. Due to the head of catalyst in the reactor the pressure at the top of column 18 may be about 15 pounds per square inch, the pressure at the point of hot catalyst inlet about 17 pounds per square inch and the pressure immediately above valve 28 about 19 or 20 pounds per square inch. The pressure immediately above valve 24 in standpipe 23 may be about 18 pounds per square inch due to the pressure head of catalyst in the regenerator and in standpipe 23.

The air stream introduced through line 27 carries the mixture of spent and regenerated catalyst back to the regenerator through transfer line 30. Considerable combustion takes place in this transfer line, particularly since the spent catalyst is hotter when it meets the air stream than it would be in the absence of the hot catalyst transfer through standpipe 23. Since the spent catalyst, however, is admixed with approximately an equal volume of regenerated catalyst, this regenerated catalyst acts as a heat accumulating means and it absorbs a sufficient amount of heat to prevent any danger of catalyst overheating in the transfer line.

The air stream with suspended catalyst is introduced at the lower part of regenerator 31 and is distributed into the regenerator by grid or perforated plate 32. The air introduced through line 27 may be at about 16 pounds per square inch pressure and the pressure immediately above grid 32 may be about 13 pounds per square inch while the pressure at the top of the regenerator may be about 8 to 10 pounds per square inch. Here again the vertical gas velocity is within the approximate range of .5 to about 3 feet per second, e. g. about 1 to 1.5 so that a fluid-like phase is maintained in the regenerator. Also a cyclone separator may be employed in the upper dilute phase to remove entrained catalyst particles and return them to the dense phase before regeneration gases are taken overhead through line 33. Standpipes 12 and 23, preferably communicate directly with the dense phase in the regenerator above grid 32. If desired or necessary another standpipe 34 may extend from the dense phase downwardly to air inlet 35, standpipe 34 being provided with slide valve 36 and aeration means 37. Catalyst from the base of standpipe 34 may thus be carried back through cooler 38 and conduit 39 to the base of regenerator 31. The upflowing catalyst may pass through tubes in cooler or heat exchanger 38 around which tubes any conventional cooling medium may be introduced; preferably water is introduced at the base of the cooler and steam is withdrawn from the upper part thereof. In a heat balance system such a recycling of the catalyst through the cooler may be unnecessary since the heat liberated in the regenerator may be absorbed by the catalyst and employed for effecting vaporization of feed as well as for effecting conversion in the reactor. Our hot catalyst transfer through standpipe 23 to stripper 19 is particularly useful in the so-called heat balance units because it promotes such effective stripping as to prevent undue amounts of hydrocarbons or carbonaceous material from being carried to the regenerator with spent catalyst.

While we have disclosed a specific example of our invention it should be understood that the invention is not limited to the particular structure or operating conditions hereinabove disclosed, the above example being by way of illustration rather than by limitation. Operating conditions will of course vary with the type of catalyst employed and the type of conversion which is desired. The arrangement of regenerator and reactor may be varied to a considerable extent as illustrated for example by U. S. 2,341,193. Where the regenerator is superimposed above the reactor in the unitary system we may introduce regenerated catalyst through one standpipe or set of standpipes into the reactor and through another standpipe or set of standpipes into the stripping zone. Many other modifications and alternative conditions will be apparent from the above description to those skilled in the art.

We claim:

1. In a catalytic conversion process wherein fluidized solids are contacted with hydrocarbon vapors in a conversion zone under conditions for effecting conversion and the accumulation of carbonaceous deposits on said solids, are passed through a stripping zone for the removal of vaporizable hydrocarbon material, are regenerated in a regeneration zone to effect combustion of said carbonaceous deposits thereby increasing the sensible heat contained in said solids and are finally returned to the conversion zone for supplying heat thereto and for effecting further conversion, the improved method of operation which comprises introducing one stream of hot regenerated catalyst from said regeneration zone to said conversion zone, introducing another stream of hot regenerated catalyst directly from said regeneration zone to said stripping zone, intermingling catalyst from said last-named stream with catalyst from the conversion zone in the upper part of said stripping zone, stripping the intermingled catalyst in said stripping zone and returning the intermingled stripped catalyst from the base of the stripping zone to the regeneration zone.

2. The method of claim 1 which includes the step of maintaining the temperature of the regeneration zone at least 100° F. higher than the temperature of the conversion zone.

3. The method of claim 1 which includes the step of introducing at least 20 weight percent but not more than 200 weight percent of hot regenerated catalyst to the stripping zone based on relatively spent catalyst transferred from the conversion zone to the stripping zone.

4. The method of claim 1 which includes the steps of maintaining the conversion zone at a temperature within the approximate range of 850° F. to 950° F., maintaining the regeneration zone at a temperature within the approximate range of 1000° F. to 1100° F. and transferring directly from the regeneration zone to the stripping zone at least 20% but not more than about 200% by weight of hot regenerated catalyst based on catalyst introduced to the stripping zone from the conversion zone.

5. The method of claim 1 which includes the step of passing a stripping gas upwardly through said stripping zone at a sufficiently high velocity to effect turbulence therein whereby the hot regenerated catalyst is intimately mixed with the catalyst from the conversion zone.

6. A catalytic conversion process which comprises suspending hot regenerated catalyst of small particle size in a hydrocarbon stream and introducing said stream at a low point in a conversion zone, maintaining an upward vertical gas velocity in said conversion zone within the approximate range of .5 to 3 feet per second whereby a dense turbulent suspended catalyst phase is maintained therein, withdrawing catalyst directly from said dense phase into a stripping zone, passing a stripping gas upwardly through said stripping zone, suspending catalyst from said stripping zone in an air stream and introducing said stream into a regeneration zone, which is at a higher elevation than the stripping zone, maintaining an upward vertical gas velocity in said regeneration zone within the approximate range of .5 to 3 feet per second, transferring one portion of hot regenerated catalyst from the regeneration zone to said conversion zone for supplying heat thereto and promoting conversion therein, transferring another portion of said hot regenerated catalyst directly to said stripping zone as a downwardly moving column of aerated dense phase solids for supplying heat to the stripping zone and admixing said last-named hot regenerated catalyst with catalyst introduced into the stripping zone from the conversion zone whereby said regenerated catalyst is returned to the regenerator in admixture with relatively spent catalyst from the conversion zone.

7. A catalytic conversion process which comprises continuously introducing hot regenerated catalyst of small particle size into a conversion zone, passing a gasiform hydrocarbon charging stock stream unpwardly through said conversion zone at a velocity within the approximate range of .5 to 3 feet per second for maintaining the catalyst in dense phase turbulent suspended condition while effecting conversion of said charging stock, continuously withdrawing catalyst directly and downwardly from said dense phase at substantially the same rate as the catalyst is introduced thereto, introducing said downwardly withdrawn catalyst into the upper part of a stripping zone while the catalyst remains in dense phase condition, introducing hot regenerated catalyst from a regeneration zone directly into the upper part of said stripping zone and commingling said hot regenerated catalyst with catalyst introduced from the conversion zone for supplying additional heat thereto, passing a stripping gas upwardly through the admixed catalyst material in the stripping zone at a rate sufficient to maintain the catalyst in dense phase condition, introducing catalyst from the base of said stripping zone to a regeneration zone, heating said catalyst in the regeneration zone to a temperature higher than the temperature in the conversion zone, returning a part of the regenerated catalyst from the regeneration zone to the conversion zone and returning another part of the regenerated catalyst 45 directly from the regeneration zone to the stripping zone.

8. In a catalytic conversion process which comprises continuously introducing hot regenerated catalyst of small particle size into a conversion zone, passing a gasiform hydrocarbon charging stock stream upwardly through the conversion zone at a velocity for maintaining a dense turbulent catalyst phase superimposed by a light catalyst phase and under conditions for effecting conversion of said charging stock and deactivation of said catalyst, continuously withdrawing deactivated catalyst from the dense phase in the conversion zone at substantially the same rate as catalyst is introduced thereto, introducing the withdrawn deactivated catalyst into the upper part of a stripping zone, introducing a dense phase stream of hot regenerated catalyst from a regeneration zone directly into the upper part of said stripping zone and commingling said hot regenerated catalyst with deactivated catalyst introduced from the conversion zone for supplying additional heat to the deactivated catalyst, passing a stripping gas upwardly through the admixed catalyst material in the stripping zone at a rate sufficient to maintain the catalyst in dense phase condition but insufficient to cause a net upward flow of catalyst in said zone, introducing catalyst from the base of said stripping zone to a regeneration zone, heating the catalyst in the regeneration zone to a temperature higher than the temperature in the conversion zone, returning a part of the regenerated catalyst from the regeneration zone to the conversion zone and returning another part of the regenerated catalyst directly from the regeneration zone to the stripping zone.

ROBERT J. HENGSTEBECK.
ROBERT S. McDANIEL.

REFERENCES CITED

The following references are of record in the file of this patent:

UNITED STATES PATENTS

| Number | Name | Date |
|---|---|---|
| 2,311,564 | Munday | Feb. 16, 1943 |
| 2,326,705 | Thiele et al. | Aug. 10, 1943 |
| 2,327,175 | Conn | Aug. 17, 1943 |
| 2,341,193 | Scheineman | Feb. 8, 1944 |

Disclaimer 2,451,619.—*Robert J. Hengstebeck*, Chicago, and *Robert S. McDaniel*, Alton, Ill. CATALYTIC CONVERSION PROCESS. Patent dated Oct. 19, 1948. Disclaimer filed Dec. 23, 1949, by the assignee, *Standard Oil Company*.

Hereby enters this disclaimer to, but only to, claims 1, 2, and 5 in said patent.
[*Official Gazette February 14, 1950.*]

per second, transferring one portion of hot regenerated catalyst from the regeneration zone to said conversion zone for supplying heat thereto and promoting conversion therein, transferring another portion of said hot regenerated catalyst directly to said stripping zone as a downwardly moving column of aerated dense phase solids for supplying heat to the stripping zone and admixing said last-named hot regenerated catalyst with catalyst introduced into the stripping zone from the conversion zone whereby said regenerated catalyst is returned to the regenerator in admixture with relatively spent catalyst from the conversion zone.

7. A catalytic conversion process which comprises continuously introducing hot regenerated catalyst of small particle size into a conversion zone, passing a gasiform hydrocarbon charging stock stream upwardly through said conversion zone at a velocity within the approximate range of .5 to 3 feet per second for maintaining the catalyst in dense phase turbulent suspended condition while effecting conversion of said charging stock, continuously withdrawing catalyst directly and downwardly from said dense phase at substantially the same rate as the catalyst is introduced thereto, introducing said downwardly withdrawn catalyst into the upper part of a stripping zone while the catalyst remains in dense phase condition, introducing hot regenerated catalyst from a regeneration zone directly into the upper part of said stripping zone and commingling said hot regenerated catalyst with catalyst introduced from the conversion zone for supplying additional heat thereto, passing a stripping gas upwardly through the admixed catalyst material in the stripping zone at a rate sufficient to maintain the catalyst in dense phase condition, introducing catalyst from the base of said stripping zone to a regeneration zone, heating said catalyst in the regeneration zone to a temperature higher than the temperature in the conversion zone, returning a part of the regenerated catalyst from the regeneration zone to the conversion zone and returning another part of the regenerated catalyst directly from the regeneration zone to the stripping zone.

8. In a catalytic conversion process which comprises continuously introducing hot regenerated catalyst of small particle size into a conversion zone, passing a gasiform hydrocarbon charging stock stream upwardly through the conversion zone at a velocity for maintaining a dense turbulent catalyst phase superimposed by a light catalyst phase and under conditions for effecting conversion of said charging stock and deactivation of said catalyst, continuously withdrawing deactivated catalyst from the dense phase in the conversion zone at substantially the same rate as catalyst is introduced thereto, introducing the withdrawn deactivated catalyst into the upper part of a stripping zone, introducing a dense phase stream of hot regenerated catalyst from a regeneration zone directly into the upper part of said stripping zone and commingling said hot regenerated catalyst with deactivated catalyst introduced from the conversion zone for supplying additional heat to the deactivated catalyst, passing a stripping gas upwardly through the admixed catalyst material in the stripping zone at a rate sufficient to maintain the catalyst in dense phase condition but insufficient to cause a net upward flow of catalyst in said zone, introducing catalyst from the base of said stripping zone to a regeneration zone, heating the catalyst in the regeneration zone to a temperature higher than the temperature in the conversion zone, returning a part of the regenerated catalyst from the regeneration zone to the conversion zone and returning another part of the regenerated catalyst directly from the regeneration zone to the stripping zone.

ROBERT J. HENGSTEBECK.
ROBERT S. McDANIEL.

REFERENCES CITED

The following references are of record in the file of this patent:

UNITED STATES PATENTS

| Number | Name | Date |
| --- | --- | --- |
| 2,311,564 | Munday | Feb. 16, 1943 |
| 2,326,705 | Thiele et al. | Aug. 10, 1943 |
| 2,327,175 | Conn | Aug. 17, 1943 |
| 2,341,193 | Scheineman | Feb. 8, 1944 |

Disclaimer 2,451,619.—*Robert J. Hengstebeck*, Chicago, and *Robert S. McDaniel*, Alton, Ill. CATALYTIC CONVERSION PROCESS. Patent dated Oct. 19, 1948. Disclaimer filed Dec. 23, 1949, by the assignee, *Standard Oil Company*.

Hereby enters this disclaimer to, but only to, claims 1, 2, and 5 in said patent.
[*Official Gazette February 14, 1950.*]